June 24, 1958  A. A. GRIFFITH  2,840,322
AIR INTAKE FOR AIRCRAFT POWER PLANT INSTALLATIONS
Filed Sept. 22, 1953  4 Sheets-Sheet 1
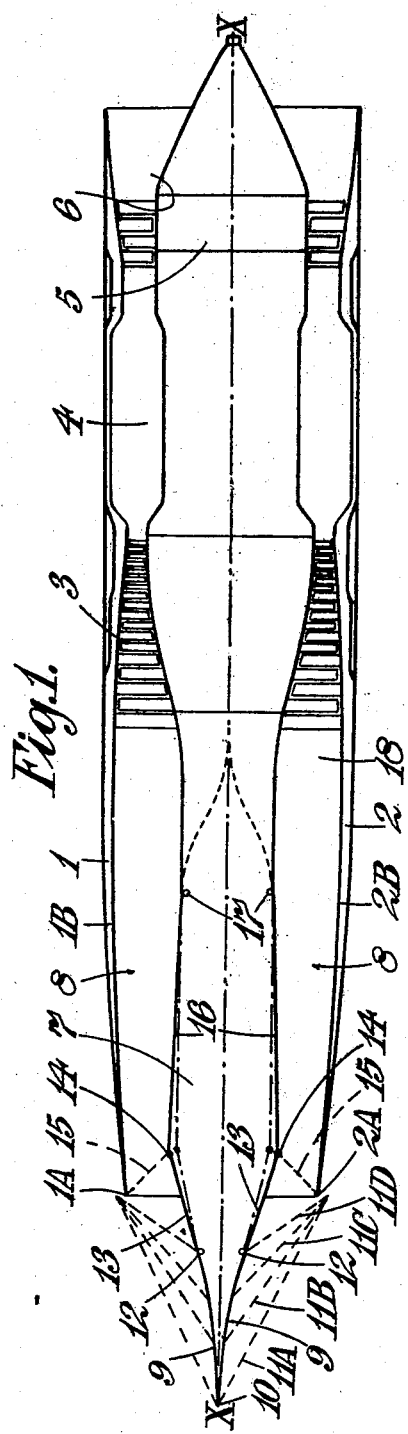
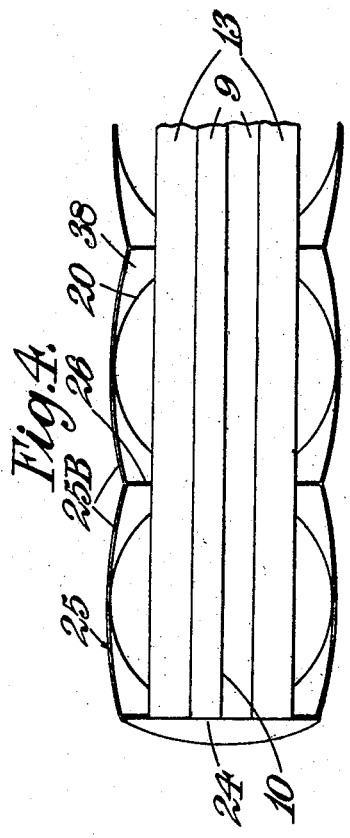

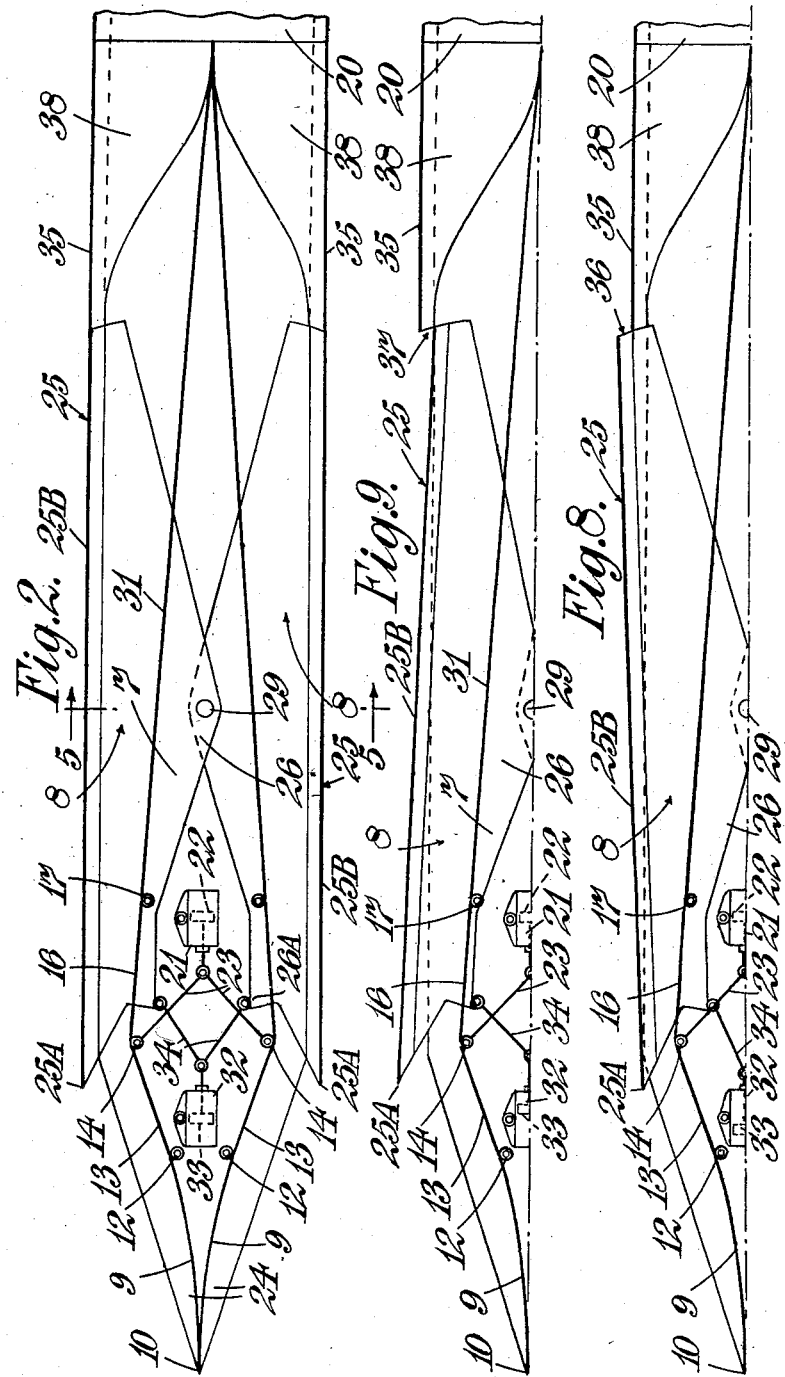

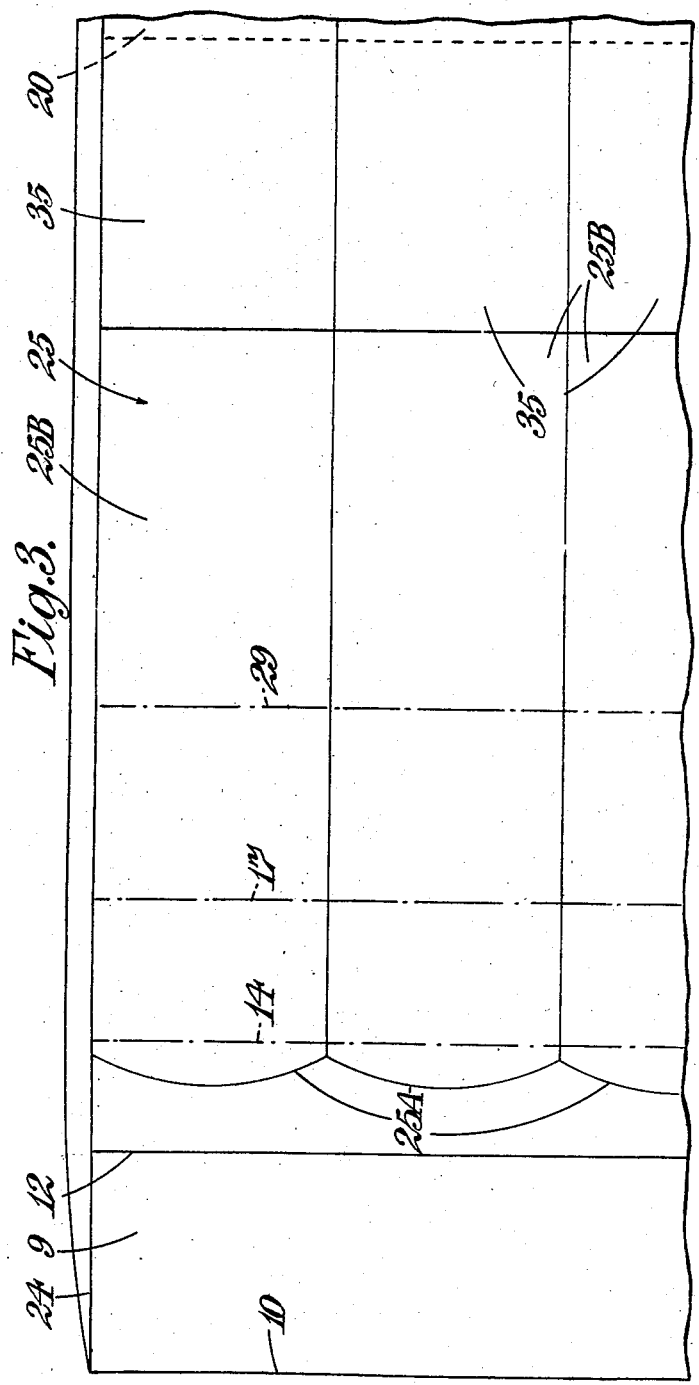

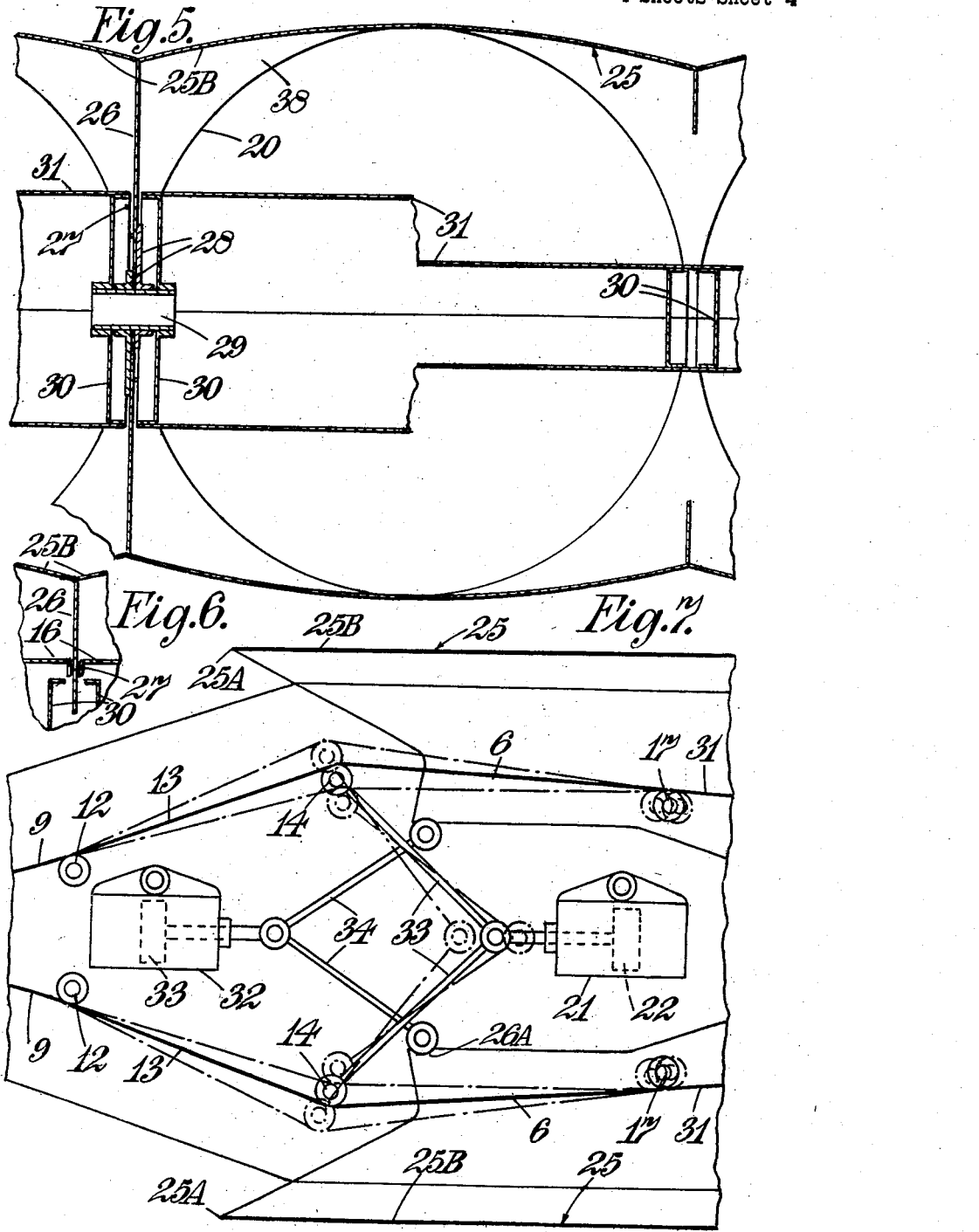

United States Patent Office 2,840,322
Patented June 24, 1958

2,840,322

AIR INTAKE FOR AIRCRAFT POWER PLANT INSTALLATIONS

Alan Arnold Griffith, Derby, England, assignor to Rolls-Royce Limited, Derby, England, a British company Application September 22, 1953, Serial No. 381,663

Claims priority, application Great Britain September 23, 1952

15 Claims. (Cl. 244—15)

This invention relates to air intakes for aircraft power plant installations and is particularly concerned with air intakes suitable for aircraft designed to fly at supersonic speeds, i. e. speeds at which the Mach number is greater than 1.0.

The primary object of the invention is to provide an air intake giving high intake efficiency and presenting low external wave drag in operation at high Mach numbers.

More specifically, the invention relates to air intakes for aircraft power plant installations and of the kind in which an intake slot is formed between leading edge lip formations of external surface members of an aerodynamic body, or of an aerofoil such as a main aerofoil surface or control surface, which slot leads through ducting within the aerodynamic body or the aerofoil to air-consuming power plant means accommodated within the body or aerofoil or in structure adjacent thereto. Such an air intake will be referred to as "an air intake of the kind specified."

According to the present invention, an air intake of the kind specified includes a centre body extending lengthwise of the slot to divide the intake into two passages, which centre body has a wedge shape afforded by (a) a forward portion of which the leading edge is at the junction of two rearwardly diverging surfaces which are concave in section in planes parallel to the direction of airflow, and which are so shaped that at the design Mach number the shock wave formations therefrom extend outside or onto the lips of the leading edge of the external surface members, (b) an intermediate portion affording surfaces which are straight lines in section in said planes and are smooth continuations of said concave surfaces, and terminating substantially on the lines of impingement on said centre body of the inwardly-directed shock wave formations arising from the leading edge lips of the intake at the design Mach number to define between said lips and said lines of impingement intake throats, and (c) a rearward portion downstream of the intermediate portion and affording inner passage walls such that the passages are of a diffusing nature, and said air intake also includes means for varying the effective areas of the throats by adjustment of parts at least of the straight-section surfaces towards and away from the leading edge lips, whilst maintaining the continuity of said concave surfaces, said straight-section surfaces and said inner passage walls. Preferably the concave surfaces are shaped so that the shock waves therefrom meet on two focal lines, one just outside or on each of the leading edge lips.

With the intake of the invention, part of the supersonic compression is effected externally and forwardly of the leading edge lip formations by the concave surfaces of the forward portion of the centre body, and the remainder in the inclined shock wave formation which is directed inwardly and rearwardly from each of the leading edge lips of the intake to the straight-section surfaces. Preferably it is arranged that, at the design Mach number, the relative amounts of the supersonic compression which are effected externally and in the inclined shock wave formations are such that the streamline deflections in the air flow arising in these two phases of compression are equal and opposite, i. e. the mean direction of air flow in the diffuser passages downstream of the throat areas is substantially parallel to the air stream impinging on the air intake in flight. As a result, the external surfaces of the aerodynamic body or aerofoil extending rearwardly from the intake lips may extend substantially along the direction of flight, i. e. parallel to the incident air stream, whereby the external wave drag is low.

Conveniently, the effective throat areas are adjusted by arranging that the walls of each of the intermediate portions which afford the straight section surfaces and of the adjacent forward portions which afford the concave surfaces are capable of relative pivoting at their junction; in addition the surfaces of the rearward portion of the centre body which define the inner walls of the diffuser passages may be hinged or pivoted to the adjacent straight-section surfaces along the lines of impingement on the centre body of the inwardly-directed shock wave formations arising from the leading edge lips of the intake at the design Mach number, and may also be guided at their rearward ends to slide with respect to adjacent rearwardly-extending walls so as to maintain continuity of the walls of the passages leading to the air-consuming power-plant.

According to a further feature of the invention, the centre body at its rearward end is shaped so that the diffuser passages merge at their rearward ends to form a passage of circular or annular section leading to the air-consuming plant.

The air-consuming power plant may for example be a gas turbine engine, or a ramjet.

The air intake will be designed for the highest Mach number expected in operation, and where the air demand is substantially constant, that is, in the case in which the power plant comprises a gas turbine engine, where the rotational speed of the engine is substantially constant, variations in the flight Mach number may be catered for by varying the effective throat area alone. When the ambient static atmospheric temperature is constant (for example under standard International Commission for Air Navigation atmosphere conditions in the stratosphere) the intake area (at constant rotational speed) will be a function of the Mach number alone, and it will be appreciated by those skilled in the art that as the Mach number increases the total head temperature at the intake, i. e. the static temperature plus the ram temperature rise, will increase.

In accordance with another feature of the invention therefore, in an aircraft power plant installation where the engine runs at substantially constant rotational speed, there may be provided temperature-sensitive means to sense the temperature of air supplied to the air-consuming power plant and control means connected with the temperature-sensitive means and with the centre body for adjusting said throat area in accordance with the temperature sensed by said temperature-sensitive means, said throat area being reduced with increase of temperature and increased with reduction of temperature.

It will be appreciated that where the ambient atmospheric temperature varies (as for example under standard International Commission for Air Navigation atmosphere conditions in the troposphere) if the intake area is maintained constant the velocity of the aircraft will decrease as the ambient static temperature increases, so that the total head temperature of the air remains consant. This is the temperature at which the air is supplied to the air-consuming plant. If the velocity of the aircraft is maintained constant and the ambient static temperature increases, due for example to decrease of altitude, so that the total head temperature increases then the intake throat area will be reduced accordingly.

Where the air demand of the power plant is variable, for example in the case of a gas turbine engine of which the rotational speed is variable, the air intake will again be designed for the highest Mach number expected in operation and in this condition the upper and lower outer surfaces of the aerodynamic body or aerofoil will be substantially parallel to its direction of motion. The total projected cross-section area of the intake between the leading edge lips will be chosen, in conjunction with the intake throat area and the air demand, so as to avoid the spillage of air over the lips of the air intake, which spillage will cause a large increase in the drag of the aerofoil.

In accordance with another feature of this invention, there may be provided means to reduce the total projected cross-section area of the intake between the leading edge lips, taken in a plane at right angles to the direction of the incident air stream, as the Mach number is reduced below the design value. This will be effected by movement of at least the leading edge portions of the upper and lower surfaces of the aerodynamic body or aerofoil.

The effective throat area between the leading edge lips and the centre body will be adjusted simultaneously with the adjustment of said leading edge portions so that the effective area of the throat is maintained at the desired value. Thus for example when the air demand is constant, that is, in the case in which the power plant comprises a gas turbine engine, when the rotational speed of the engine is constant, the form of the centre body will be adjusted simultaneously with the adjustment of the leading edge portions, so that the effective throat area is maintained constant. At constant Mach number, that is with the leading edge lips in a constant position of adjustment, the effective throat area will be varied, by adjustment of the centre body, in accordance with the air demand of the engine and will be increased as the air demand increases; that is, the effective throat area will be increased as the engine speed is increased and vice versa. It may be arranged that the effective throat area is chosen for any given set of conditions in accordance with the total temperature at the inlet to the turbine of the gas turbine engine, so that the throat area increases as a function of the total temperature at inlet to the turbine, and is also varied as a function of the total temperature of the intake air so that the throat area decreases on increase of the total temperature of the intake air.

The variation of the total cross-section area of the intake by movement of the leading edge lips is arranged to be such as to ensure that at supersonic speeds the whole of the air which occupies the projection of this cross-section area ahead of the air intake along the direction of the incident air stream passes into the air intake, and thus the air which borders this projected cross-section area will flow along the outer surface of the aerofoil, which is arranged, at the design Mach number, to be parallel to the direction of the incident air. In this way an increase of the wave drag due to the spilling of air over the lips of the intake is avoided and the wave drag is reduced to the minimum value.

By ensuring that the effective cross-section area of the intake throat has the correct value under all conditions as outlined above, the highest possible pressure recovery is obtained in the intake, that is, the intake efficiency is maintained at the highest value.

Simultaneous variations of the flight Mach number and the air demand of the engine may of course be met by simultaneous adjustment of the intake lips to the appropriate total cross-section area and of the centre body relative to the intake lips to afford the appropriate value of the throat area.

According to another feature of this invention there may be provided ports in the external surface members which are opened to permit the outlet from the intake passage of air which enters the intake but is not required by the engine. It will be appreciated that the opening of such ports has the same effect as the reduction of the intake throat area, and thus the value of the effective throat area is equal to the value of the actual throat area between the intake lips and the centre body, minus the equivalent of the area of the outlet ports.

In one construction according to this feature of the invention, the external surface members have portions which are pivoted to swing outwards aft of the lip formations to form outlets facing downstream in the direction of flow. The pivoted portions may be the leading portions of the external surface members extending from the lip formations to adjacent the engine inlet, and may be pivoted adjacent their mid length so that when the outlets are opened the lip formations are moved towards the centre body thereby simultaneously to reduce the intake area.

It may be desirable under subsonic conditions that the effective throat area should be increased over that which is possible with the leading edge lip portions in the position for flight at the design Mach number, and in accordance with another feature of this invention there may be provided ports in the external surface members which are opened to permit the passage into the intake, downstream of the intake throat portion, of ram air. Conveniently the additional intake ports may be formed by pivoting of the pivoted portions of the outer surface members which also afford the outlet ports, and the arrangement may be such that as the pivoted portions are adjusted to afford the intake ports, the leading edge lips are moved away from the centre body thereby simultaneously to increase the intake area. In this case the effective intake area is of course the effective area of the intakes between the leading edge lips and the centre body plus the effective area of the intake ports.

In accordance with yet another feature of the invention the surfaces of the centre body and more particularly those surfaces defining walls of the diffuser passages may be provided with slots or holes or may be of a porous nature to permit bleeding off the boundary layer air therefrom.

The means for effecting the adjustment of the throat areas may be manually or automatically controlled. Such means may for example comprise a pneumatic motor supplied with compressed air from the diffuser passages or may comprise an electric or hydraulic motor.

Two preferred constructions of air intake in accordance with the invention as applied to a gas turbine engine power plant accommodated within the thickness of an aerofoil forming part of an aircraft will now be described with reference to the accompanying drawings, in which—

Figure 1 is a diagrammatic longitudinal section through the first construction of air intake and also shows the engine installation, Figure 2 is a corresponding view of the second construction of air intake, Figure 3 is a plan view of part of the intake of Figure 2, Figure 4 is a front end view of part of the intake of Figure 2, Figure 5 is a section on the line 5—5 of Figure 2 on an enlarged scale, with parts broken away to show details of construction, Figure 6 is a constructional detail of the arrangement shown in Figure 2, Figure 7 is a diagrammatic view showing how parts of the intake may be adjusted in operation, Figures 8 and 9 show alternative positions for a part of the intake illustrated in Figure 2, only the half above the centre-line being shown.

Referring to Figure 1, the aerofoil comprises upper and lower surfaces 1 and 2 terminating in leading edge lip formations 1A and 2A. The gas turbine engine is illustrated diagrammatically as comprising a compressor section 3, combustion section 4, a turbine section 5 and an exhaust section 6.

The aerofoil may be adjustable as a whole with respect to a fuselage structure of the aircraft, in order to maintain the intake centre-line at zero incidence to the relative airstream, and may for example provide an adjustable tailplane; and also, if desired, a plurality of such engines may be accommodated side by side within the aerofoil.

It will be appreciated that the lips 1A and 2A provide a slot at the leading edge of the aerofoil, the lengthwise dimension of which is defined by end walls extending between the upper and lower surfaces 1 and 2.

A centre body generally shown at 7 divides the air intake into two passages 8. The centre body is symmetrical about the centre plane of the air intake indicated by line X—X and has a forward portion comprising two surfaces 9 which are concave in the section illustrated, i. e. in a plane parallel to the direction of air flow. The surfaces 9 are joined at the leading edge 10 of the forward portion of the wedge-shaped centre body, said leading edge lying forwardly of the lips 1A and 2A and extending lengthwise of the slot-shaped intake. Dotted lines 11A, 11B, 11C and 11D indicate the shock wave formations arising at the leading edge and at points on the concave surfaces 9 downstream of the leading edge, at a design Mach number which may for example be 2.0. It will be observed that these shock wave formations extend rearwardly and outwardly to pass just outside the lips 1A and 2A and the shape of the surfaces 9 is such that the shock wave formations meet on focal lines extending lengthwise of the lips 1A and 2A and just outside them. The angle through which the streamlines are deflected may be computed by means which will be well known to those skilled in the art and which is usually referred to as the method of the reversed Prandtl-Meyer expansion.

Along lines indicated at 12 the curved surfaces 9 merge into surfaces 13 which are straight in section, and are arranged to be parallel to the deflected streamlines at the design Mach number. These surfaces terminate along the lines indicated at 14, which are so disposed that the inwardly-directed shock wave formations (indicated by dotted lines 15) formed by the lips 1A and 2A at the design Mach number impinge along these lines on the wedge-shaped body 7. In this manner an intake throat of selected cross-section area is defined between the wedge-shaped body and each of the lips 1A and 2A.

It is preferably arranged that the deflection of the streamlines across the shock waves 15 is equal, but in the opposite sense, to the deflection across the shock waves 11, so that the direction of the streamlines downstream of shock waves 15 is parallel to the direction of the streamlines upstream of shock waves 11. The method of computing the deflection of the streamlines across a shock wave will be known to those skilled in the art, and convenient charts for the purpose may be found in R and M 2554 "Some data pertaining to the supersonic axial-flow compressor" by Ian M. Davidson, B. Sc., published by Her Majesty's Stationery Office.

On the downstream sides of the throats, passage of a diffusing nature lead to the air-consuming gas turbine engine power plant, the passages thus being of increasing cross-section area in the downstream direction. These passages are defined by inner walls 1B and 2B of the upper and lower surfaces of the aerofoil and upper and lower surfaces 16 of a rearwardly-tapering part of the centre body. The latter surfaces terminate at 17 and downstream thereof the centre body is shaped to provide a substantially annular-shaped intake for the gas turbine engine in the region indicated at 18. Alternatively a full circular intake may be provided by suitable shaping, shown in dotted lines. The rearward end of the rearwardly-tapering part of the centre body preferably slides within the part of the centre body downstream thereof, whilst the leading edges of the wall surfaces 16 are pivoted at 14 to the straight-section portions 13. In this manner the throat areas can be adjusted by moving the hinge lines 14 towards and away from the lips 1A and 2A, such movement being accompanied by pivotal movement along the lines 12 and sliding movement at points 17.

Any suitable mechanism may be provided for effecting the adjustment of the throat areas. For example a hydraulic or pneumatic jack (such as that illustrated at 21 in Figure 2) may be located with its cylinder axis on the line X—X, the piston rod being connected by links to the pivot axes 14. In this manner movement of the piston in the cylinder effects simultaneous and equal adjustment of the throat area. Conveniently a jack of the pneumatic type is supplied with compressed air abstracted from the duct. The jack in this embodiment may be controlled manually or automatically in accordance with the flight Mach number, in any known or convenient manner.

Since at a given rotational speed of a gas turbine engine the volume of air consumed by the engine is a function of the total temperature of the gas entering the engine, it may be convenient to control the throat areas in accordance with this temperature. Temperature-sensitive means in the duct, or temperature-sensitive means externally of the aircraft, sensitive to total temperature, i. e. ambient temperature plus the pitot temperature rise, may be incorporated in known or convenient manner is an electrical bridge circuit, the output from which is effective to control the adjustment of actuating mechanism such as that described so that the effective throat areas are adjusted in desired relationship with the temperature sensed.

To prevent transverse leakage of the air off the centre body the end walls of the slots may have triangular spill barriers with forward edges extending from the leading edge lips to the leading edge of the centre body.

A second construction having such spill barriers and also embodying other features will now be described with reference to Figures 2 to 9 of the drawings.

In this construction, the air intake serves a number of engines arranged side by side and the centre body 7, which is as described with reference to Figure 1, extends across the inlets 20 of the engines from one end to the other. The centre body 7 has adjustable portions 13, 16 with pivots at 12 and 14 and a sliding joint at 17 and to control the adjustment there is provided a ram 21 whereof the piston 22 is connected by links 23 to the pivots 14. Clearly as the piston 22 moves to the left the pivots 14 will be moved outwards to reduce the throat area (Figure 7 chain lines) and as the piston 22 moves to the right the pivots move inwards (Figure 7 dotted lines) to increase the throat area. The ram 21 may be controlled manually or automatically in accordance with the air demand, for example in accordance with the intake air temperature and the turbine inlet temperature, in any known or convenient manner.

At each end of the centre body 7, there is provided a wall forming a spill barrier 24 to prevent lateral spillage of air off the centre body.

In this construction, the leading portions 25 of the external walls are also made adjustable from their lips 25A to adjacent the inlets 20 of the engines.

Each wall 25 comprises a number of sections 25B, one for each engine inlet 20, which sections 25B are curved (Figure 4) to be concave towards the centre body 7 and are joined each to the adjacent sections 25B along lines contained in planes passing between the adjacent inlets 20. The lip portion 25A of each section 25B is also curved (Figure 3) to project forwards more at its centre, than at its ends, so that each point on the lip of the part-cylindrical section 25B lies on the same inclined transverse plane.

Supporting wall portions 26 extend inwardly from the junctions of the sections 25B through slots 27 (Figure 5) in the centre body 7, and the supporting wall portions 26 have bearing elements 28 secured to them at locations within the centre body 7 and at about the mid-length of the wall portions 26. The bearing elements 28 are engaged on supporting tubular pivot elements 29 secured in longitudinal channel members 30 to which are also secured the non-adjustable parts 9, 31 of the centre body 7.

A ram 32 (Figures 2, 8, 9) is provided within the centre body 7 and secured to a fixed part, for example to a channel member 30, and the ram piston 33 is connected by links 34 to noses 26A on the supporting wall portions 26.

It is arranged that under design Mach number conditions, that is at say the highest Mach number expected in operation, the pivoted leading wall portions 25 are in the position in which they form smooth continuations of the rearward fixed external walls which are formed in a number of outwardly convex sections 35 similar to the sections 25B. In this condition the external wave drag is a minimum, as more fully discussed above; the intake throat area is adjusted in accordance with the air demand by means of the mechanism shown in Figure 7.

At Mach numbers below the design value, the ram piston 33 is moved to the left (Figure 8) so reducing the projected cross-section area of the intake and opening up rearwardly-facing ports 36 in the external walls of the intake to permit excess air to flow rearwardly out from the passages 8. In this position also of the wall portions 25 the centre body is adjusted by means of ram 22 so that the intake area is in accordance with the air demand, taking into account that the effective intake area is less than the actual area between lips 25A and lines 14 due to the outflow of air from ports 36.

Under operating conditions at Mach numbers below 1.0, i. e. subsonic conditions, the intake area may be increased to a greater value than is possible with the wall portions 25 in the position of Figure 2, by moving piston 33 to the right, and under these conditions, additional inlets 37 (Figure 9) are formed at the trailing ends of the movable wall portion 25 to permit air to flow into the passages 8. The ram 32 may be controlled manually, or automatically in accordance with the flight Mach number in any known or convenient manner, and this control may be linked for simultaneous operation to the control of ram 22.

Rearwardly of the adjustable walls 25 there are provided fairings 38, shaped so that the passages 8 are changed in section from substantially rectangular at the upstream ends of the fairings 8 to circular at the inlets 20 to the engines.

In order to improve the efficiency of diffusion, the wedge-shaped body and more particularly the surfaces 16 may be apertured or may be of a porous nature, permitting the boundary layer to be sucked in to the interior of the centre body, which may communicate with a location at which the pressure is substantially atmospheric pressure, thus using the difference of pressures to suck away the boundary layer, whereby the necessity for an auxiliary abstractor pump is obviated.

At the design Mach number the relative proportion of the supersonic compression which is effected across the shock waves externally of the duct, i. e. those emanating from the curved surfaces 9, and that effected across the shock waves in the throats defined between leading edge lips 1A and 2A and points 14, are so chosen that the streamline deflection of the air stream entering the intake ducting is equal and opposite in the two phases of compression. In this manner it can conveniently be arranged that the external walls of the surfaces 1 and 2 leading from the lips 1A and 2A lie substantially parallel to the direction of flight, i. e. parallel to the incident air stream, thereby avoiding any substantial external wave drag.

I claim:

1. An air intake for an aircraft power plant installation of the kind in which an intake slot is formed between leading edge lip formations of external surface members of an aerodynamic structure, which slot leads through ducting to air-consuming power plant means, comprising a centre body extending lengthwise of the slot to divide the intake into two passages, which centre body has a wedge shape afforded by a forward portion of which the leading edge is at the junction of two rearwardly-diverging surfaces which are concave in section in planes parallel to the direction of airflow, and which are so shaped that at the design Mach number the shock wave formations therefrom extend outside or onto said leading edge lips, an intermediate portion having walls facing the leading edge lip formations, the walls affording surfaces which are straight lines in section in said planes and are smooth continuations of said concave surfaces and terminate substantially on the lines of impingement on said centre body of the inwardly-directed shock wave formations arising from the leading edge lips of the intake at the design Mach number to define between said lips and said lines of impingement intake throats, said walls of the intermediate portion being angularly adjustable relative to the forward portion towards and away from the leading edge lip formations and a rearward portion downstream of the intermediate portion and affording inner passage walls such that the passages are of a diffusing nature, means connected to effect said angular adjustment of the walls of the intermediate portion relative to the forward portion for varying the effective areas of the throats, whilst maintaining the continuity of said concave surfaces, said straight-section surfaces and said inner passage walls.

2. An air intake as claimed in claim 1, comprising pivotal joint means between the walls of the intermediate portion which afford the straight-section surfaces and the walls of the forward portion which afford the concave surfaces and means to effect pivoting at said junction thereby to vary the effective areas of the throats of the intake.

3. An air intake as claimed in claim 2, comprising also pivotal joint means between the surfaces of the rearward portion which define the inner walls of the diffuser passages and the walls of the intermediate portion which afford the straight-section surfaces, said joint means being along the lines of impingement on the centre body of the inwardly-directed shock wave formations arising from the leading edge lips.

4. An air intake as claimed in claim 3, comprising also rearwardly-extending fixed walls downstream of the inner walls of said rearward portion, and wherein there is provided sliding joint means between the rearward ends of said surfaces of the rearward portion and said rearwardly-extending fixed walls.

5. An air intake as claimed in claim 4 wherein said means to effect pivoting comprises a ram having a piston connected by links to the walls of the intermediate portion adjacent their rearward ends.

6. An air intake as claimed in claim 1 for a gas turbine engine aircraft power plant installation where the engine runs at substantially constant rotational speed, comprising also temperature-sensitive means to sense the temperature of air supplied to the power plant and control means connected with the temperature-sensitive means and with the centre body to adjust said throat area in accordance with the temperature sensed by the temperature-sensitive means, in the sense to reduce said throat area with increase of temperature and vice versa.

7. An air intake as claimed in claim 1, comprising also means to reduce the total projected cross-section area of the intake between the leading edge lips, taken in a plane at right angles to the direction of the incident air stream, as the Mach number is reduced below the design value.

8. An air intake for an aircraft power plant installation of the kind in which an intake slot is formed between leading edge lip formations of external surface members of an aerodynamic structure, which slot leads through ducting within the aerodynamic structure to air-consuming power plant means, comprising a pair of adjustable external surface members each having a leading edge lip and defining between them said slot, means to adjust said external surface members towards and away from one another thereby to vary the projected cross-section area of the intake, a centre body extending lengthwise of the slot to divide the intake into two passages, which centre body has a wedge shape afforded by a forward portion of which the leading edge is at the junction of two rearwardly-diverging surfaces which are concave in section in planes parallel to the direction of airflow, and which are so shaped that at the design Mach number the shock wave formations therefrom extend outside or onto said leading edge lips, an intermediate portion having walls facing the leading edge lip formations, the walls affording surfaces which are straight lines in section in said planes and are smooth continuations of said concave surfaces and terminate substantially on the lines of impingement on said centre body of the inwardly-directed shock wave formations arising from the leading edge lips of the intake at the design Mach number to define between said lips and said lines of impingement intake throats, said walls of the intermediate portion being angularly adjustable relative to the forward portion towards and away from the leading edge lip formations and a rearward portion downstream of the intermediate portion and affording inner passage walls which diverge from the inner surfaces of the external surface members whereby the passages are of a diffusing nature, and means connected to effect said angular adjustment of the walls of the intermediate portion relative to the forward portion towards and away from the leading edge lips while maintaining the continuity of said concave surfaces, said straight-section surfaces and said inner passage walls, thereby to vary the effective areas of the intake throats.

9. An air intake as claimed in claim 8, comprising also means to adjust the external surface members in accordance with the Mach number in the sense to reduce the projected cross-section area of the intake between the leading edge lips on decrease of Mach number and vice versa, and means to adjust parts at least of said straight-section surfaces of the centre body to vary the throat area of the intake in accordance with the air demand of the power plant, in the sense of increasing the effective throat area as the air demand is increased and vice versa.

10. An air intake as claimed in claim 8, wherein the surfaces of the centre body are provided with slots or holes or are made of a porous nature to permit bleeding-off therefrom of the boundary layer air.

11. In an air intake structure for an aircraft power-plant installation designed for supersonic speeds and of the kind comprising external surface members of an aerodynamic structure said members having leading edge lip formations between which is formed an intake slot leading through air intake ducting to air consuming power-plant means, and which external surface members have inner surfaces affording outer passage walls of said air intake ducting which extend rearwardly from said leading edge lip formations; the provision of a centre body extending lengthwise of the slot to divide the air intake ducting into two passages, which centre body has a wedge shape afforded by a forward portion having a leading edge and two rearwardly-diverging surfaces which meet at and extend rearwardly from said leading edge and which are concave in section in planes parallel to the direction of air flow, an intermediate portion having walls facing said leading edge lip formations, which walls afford surfaces which are straight lines in section in said planes, are smooth continuations of said concave surfaces and terminate adjacent to and rearwardly of the plane of the leading edge lips to define intake throats between said lips and the termination of said straight surfaces, said walls of the intermediate portion being angularly adjustable with respect to the forward portion towards and away from said leading edge lip formations, and a rearward portion downstream of the intermediate portion and affording inner passage walls which diverge from said outer passage walls in the direction of flow through the air intake ducting whereby the passages are of increasing cross-section area in the direction of flow, and means connected to the intermediate portion to effect angular adjustment of the walls thereof towards and away from the leading edge lip formations thereby to vary the effective areas of the throats, whilst maintaining the continuity of said concave surfaces, said straight section surfaces and said inner passage walls.

12. An air intake for an aircraft power plant installation of the kind in which an intake slot is formed between leading edge lip formations of external surface members of an aerodynamic structure, which slot leads through ducting within the aerodynamic structure to air-consuming power plant means, comprising a pair of adjustable external surface members each having a leading edge lip and defining between them said slot, means to adjust said external surface members towards and away from one another thereby to vary the projected cross-section area of the intake, outlet ports in the external surface members, means to open said ports to permit the outlet from the intake passage of air which enters the intake but is not required by the engine, a center body extending lengthwise of the slot to divide the intake into two passages, which center body has a wedge shape afforded by a forward portion of which the leading edge is at the junction of two rearwardly-diverging surfaces which are concave in section in planes parallel to the direction of airflow, and which are so shaped that at the design Mach number the shock wave formations therefrom extend outside or onto said leading edge lips, an intermediate portion affording surfaces which are straight lines in section in said planes and are smooth continuations of said concave surfaces, and terminating substantially on the lines of impingement on said center body of the inwardly-directed shock wave formations arising from the leading edge lips of the intake at the design Mach number to define between said lips and said lines of impingement intake throats, and a rearward portion downstream of the intermediate portion and affording inner passage walls which diverge from the inner surfaces of the external surface members whereby the passages are of a diffusing nature, and said air intake also comprises means to adjust parts at least of the straight-section surfaces towards and away from the leading edge lips while maintaining the continuity of said concave surfaces, said straight-section surfaces and said inner passage walls, thereby to vary the effective areas of the intake throats.

13. An air intake as claimed in claim 12, wherein said external surface members comprise portions which are pivoted adjacent their mid-points and extend from the lip formations to adjacent the engine outlet and cooperate with said outlet ports to close them, and comprising means to rock said portions about their pivots, whereby on pivoting of the portions to open the outlets, the lip formations are moved towards the center body thereby simultaneously to reduce the intake area.

14. An air intake for an aircraft power plant installation of the kind in which an intake slot is formed between leading edge lip formations of external surface members of an aerodynamic structure, which slot leads through ducting within the aerodynamic structure to air-consuming power plant means, comprising a pair of adjustable external surface members each having a leading edge lip and defining between them said slot, means to adjust said external surface members towards and away from one another thereby to vary the projected cross-section area of the intake, additional inlet ports in the external surface members, and means to open said ports to permit the passage of ram air into the intake downstream of the intake throat portion, a center body extending lengthwise of the slot to divide the intake into two passages, which center body has a wedge shape, afforded by a forward portion of which the leading edge is at the junction of two rearwardly-diverging surfaces which are concave in section in planes parallel to the direction of airflow, and which are so shaped that at the design Mach number the shock wave formations therefrom extend outside or onto said leading edge lips, an intermediate portion affording surfaces which are straight lines in section in said planes and are smooth continuations of said concave surfaces, and terminating substantially on the lines of impingement on said center body of the inwardly-directed shock wave formations arising from the leading edge lips of the intake at the design Mach number to define between said lips and said lines of impingement intake throats, and a rearward portion downstream of the intermediate portion and affording inner passage walls which diverge from the inner surfaces of the external surface members whereby the passages are of a diffusing nature, and said air intake also comprises means to adjust parts at least of the straight-section surfaces towards and away from the leading edge lips while maintaining the continuity of said concave surfaces, said straight-section surfaces and said inner passage walls, thereby to vary the effective areas of the intake throats.

15. An air intake as claimed in claim 14 wherein said external surface members comprise portions which are pivoted adjacent their midpoints and extend from the lip formations to adjacent the engine inlet and cooperate with said additional inlet ports to close them, and means to rock said portions about their pivots, whereby on pivoting of the portions to open the inlets the lip formations are moved away from the center body thereby simultaneously to increase the intake area.

References Cited in the file of this patent

UNITED STATES PATENTS

| | | |
|---|---|---|
| 2,280,835 | Lysholm | Apr. 28, 1942 |
| 2,384,893 | Crook | Sept. 18, 1945 |
| 2,540,594 | Price | Feb. 6, 1951 |
| 2,563,305 | Britton | Aug. 7, 1951 |
| 2,575,879 | Lombard | Nov. 20, 1951 |
| 2,631,425 | Nordfors | Mar. 17, 1953 |
| 2,684,570 | Nordfors | July 27, 1954 |
| 2,700,515 | Reder | Jan. 25, 1955 |